Oct. 14, 1969  C. HERRERA C.  3,472,339
DEVICE FOR SUPPORTING A FISHERMAN OVER A BODY OF WATER
Filed Feb. 21, 1967  3 Sheets-Sheet 1

INVENTOR.
CRISOGONO HERRERA C.
BY *Sternberg, Blake*
ATTORNEYS

Oct. 14, 1969   C. HERRERA C.   3,472,339
DEVICE FOR SUPPORTING A FISHERMAN OVER A BODY OF WATER
Filed Feb. 21, 1967   3 Sheets-Sheet 2
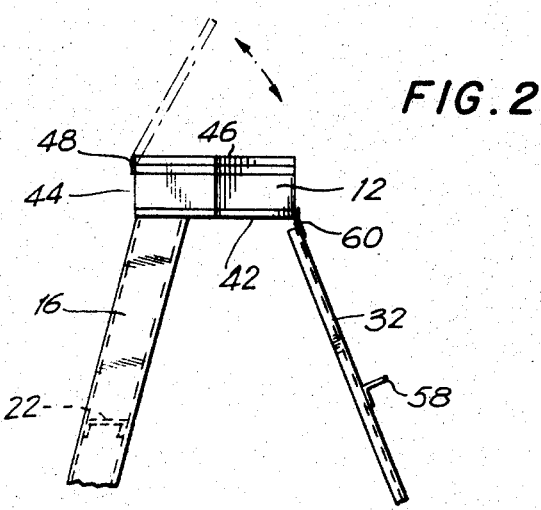
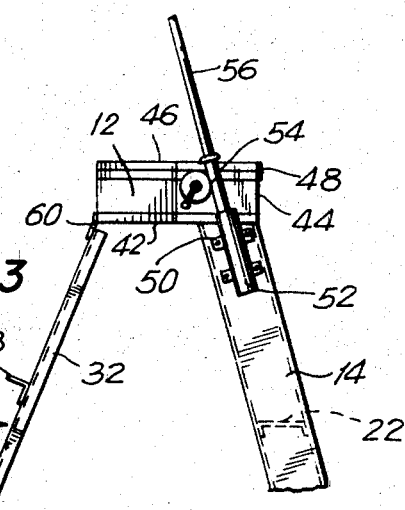
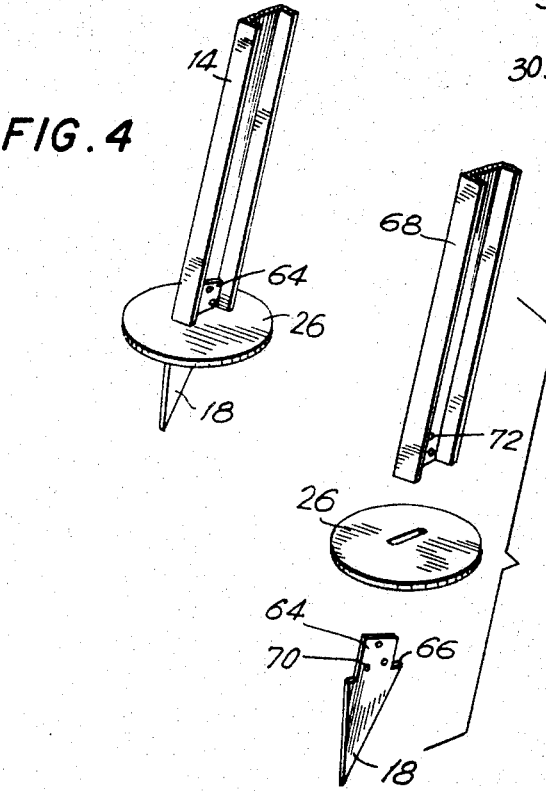
INVENTOR.
CRISOGONO HERRERA C.
BY *Stinking + Blake*
ATTORNEYS Oct. 14, 1969 C. HERRERA C. 3,472,339
DEVICE FOR SUPPORTING A FISHERMAN OVER A BODY OF WATER
Filed Feb. 21, 1967 3 Sheets-Sheet 3
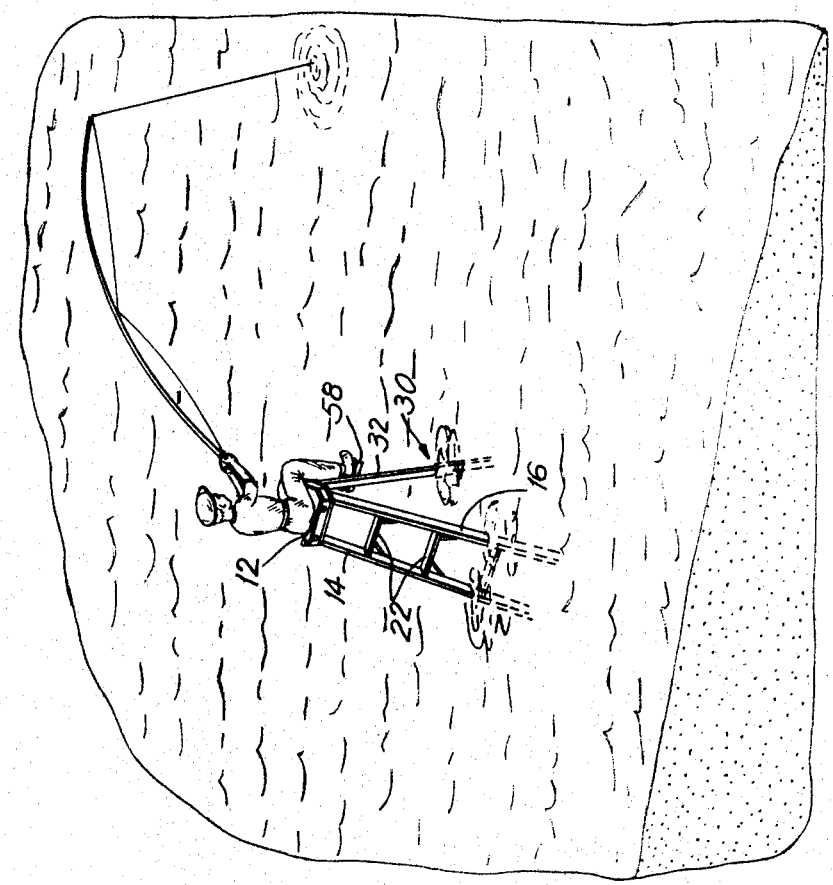
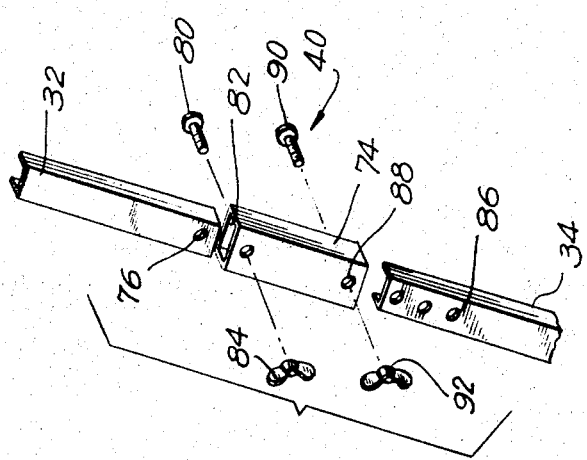
INVENTOR.
CRISOGONO HERRERA C.
BY
ATTORNEYS

United States Patent Office 3,472,339
Patented Oct. 14, 1969

3,472,339
DEVICE FOR SUPPORTING A FISHERMAN OVER A BODY OF WATER
Crisogono Herrera C., Camino a Santa Domingo, Fraccionamiento El Nogalar, San Nicolas de los Garza, Nuevo Leon, Mexico
Filed Feb. 21, 1967, Ser. No. 617,655
Int. Cl. E06c 1/39, 1/22
U.S. Cl. 182—116          2 Claims

ABSTRACT OF THE DISCLOSURE

A device for supporting a fisherman over a relatively shallow body of water, this device including a seat for the fisherman and a pair of elongated substantially rigid legs fixed to and extending downwardly from this seat and located in a common plane with these legs terminating in bottom ends distant from the seat. A third leg is spaced from the plane which includes the above pair of legs and is hingedly connected to and also extends downwardly from the seat so as to be swingable toward and away from the pair of legs which are located in the common plane, and this third leg also terminates in a bottom end distant from the seat.

---

The present invention relates to supporting devices.

In particular, the present invention relates to a device which is adapted to support a fisherman over a shallow body of water.

At the present time when fishing in a relatively shallow body of water, a fisherman will either stand at the shore line or will situate himself directly in the body of water while fishing therein. The fisherman himself carries the fishing gear and fishes in the body of water while remaining in close proximity thereto. This necessity for the fisherman to carry the fishing gear on his person and his close proximity to the body of water provide inconveniences. The fisherman is loaded down by the fishing gear so that his operations are hampered, and in addition because of his close proximity to the body of water the fisherman does not have with respect to the body of water the wide range of operating activity which he might have if he were situated more distant from the body of water.

It is accordingly a primary object of the present invention to provide a device which will avoid the above drawbacks.

In particular, it is an object of the present invention to provide for a fisherman a light, portable device which can be carried by the bed beneath a body of water while providing above the body of water an area at which the fisherman can situate himself so that his operations with respect to the body of water can be carried out far more conveniently than if the fisherman were standing at the shore line or directly in the body of water.

In addition, it is an object of the present invention to provide a device for this type which is capable of conveniently carrying various articles of fishing gear, so that this gear need not be carried on the person of the fisherman, and thus his operations are not hampered by the necessity of carrying fishing gear on his own person.

It is also an object of the present invention to provide a device of this type which can be stably supported by a relatively soft bed beneath a body of water without any danger of the device continuously sinking deeper and deeper into such a soft bed.

Furthermore, it is an object of the present invention to provide a device of the above general type which can be conveniently adjusted so as to adapt itself to the slope of the bed beneath the body of water, thus making it possible to maintain the support for the fisherman in a substantially horizontal attitude, irrespective of the slope of the bed beneath the body of water.

Also, the objects of the present invention include the provision of a device of the above type which is relatively simple and inexpensive while at the same time being rugged and easy to manipulate and carry about.

The device of the invention includes a seat and a pair of elongated substantially rigid legs fixed to and extending downwardly from the seat and located in a given plane with these legs terminating in bottom ends, respectively, which are distant from the seat. A plurality of steps which are respectively located at different elevations extend between and are fixedly carried by this pair of legs. A third leg extends downwardly from the seat and is spaced from the plane in which the above-mentioned pair of legs are located, and this third leg is hingedly connected to the seat for swinging movement toward and away from the plane in which the pair of legs are located, this third leg also terminating distant from the seat in a bottom free end. Thus, this construction of the invention provides a tripod-type of support for the seat with the third leg being swingable toward and away from the plane which includes the pair of legs so that after locating the third leg at a suitable angular position the bottom ends of all of the legs can be introduced into the bed beneath a shallow body of water with this bed supporting the device with the seat thereof situated at a suitable elevation above the body of water. After the device is thus mounted on the bed beneath the body of water, the fisherman can go up the steps and support himself on the seat to carry out the fishing operations therefrom.

The invention is illustrated by way of example in the accompanying drawings which form part of this application and in which:

FIG. 2 is a fragmentary side elevation of the upper part of the device of FIG. 1 as seen from the right of FIG. 1;

FIG. 3 is a fragmentary side elevation of the upper part of the device of FIG. 1 as seen from the left of FIG. 1;

FIG. 4 is a fragmentary perspective illustration of the bottom end region of each leg of the device of the invention;

FIG. 5 is an exploded view showing in a side elevation the components which are assembled to form the structure of FIG. 4;

FIG. 6 is an exploded fragmentary elevation showing the details of a telescope means used with one of the legs of the device of the invention; and FIG. 7 is a pictorial illustration of the manner in which the device of the invention is used by the fisherman.

Figure 1:
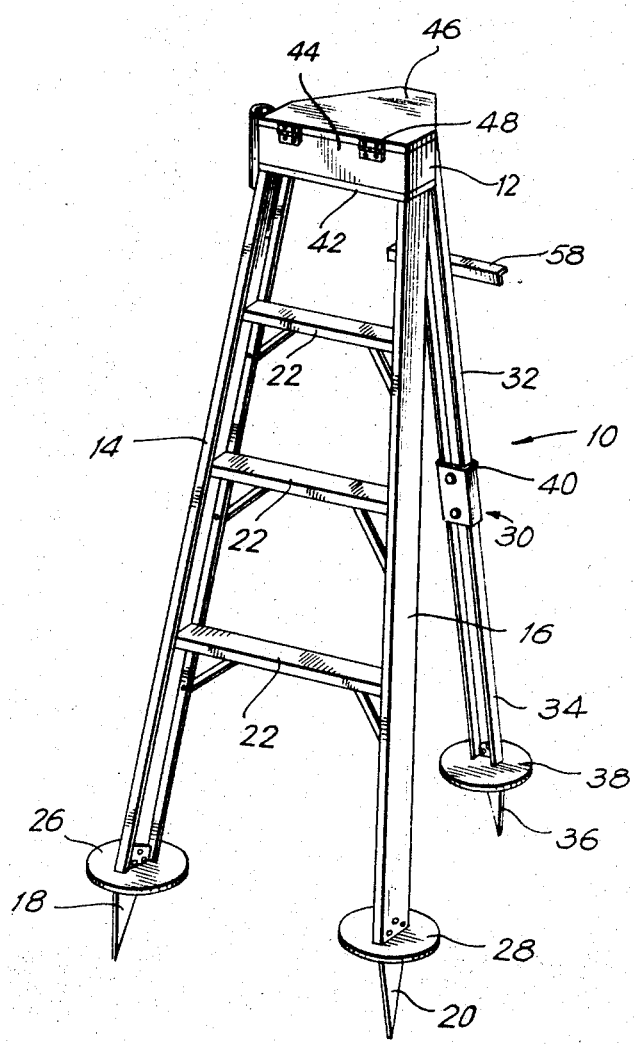
FIG. 1 is a perspective illustration of one possible embodiment of a device according to the present invention.

Referring now to the drawings, the device 10 which is shown in FIG. 1 includes a seat 12 and a pair of legs 14 and 16 fixed to and extending downwardly from the seat 12, these legs 14 and 16 being located in a given plane and terminating distant from the seat 12 in bottom free ends 18 and 20, respectively, which are of a substantially pointed configuration. The elongated legs 14 and 16 are relatively rigid and may be made from elongated metallic channel members. A plurality of steps 22 are respectively located at different elevations and extend between and are fixed to the pair of legs 14 and 16 in the manner shown in FIG. 1. Suitable braces 24 may be provided to enhance the rigidity of the connection between the steps 22 and the legs 14 and 16.

The legs 14 and 16 respectively carry just above their pointed bottom end portions 18 and 20, respectively, flat plates 26 and 28 which are parallel to the seat 12. These plates 26 and 28 may be of a circular configuration and are fixed to the legs 14 and 16, respectively, just above the pointed free end portions 18 and 20 thereof, in a manner described in greater detail below.

A third leg 30 is hingedly connected at its upper end to the seat 12 for swinging movement with respect thereto toward and away from the plane which includes the legs 14 and 16. This third leg 30 has an upper portion 32 which is directly hinged to the seat 12 and a lower portion 34 which is aligned with the portion 32 and which extends downwardly beyond the latter, this lower portion 34 terminating in the bottom pointed free end 36 which is distant from the seat 12. The leg 30 also fixedly carries just above its bottom pointed free end 36 a circular flat plate 38 which is parallel to the seat 12 and which is also fixed to the leg 30 in a manner described below. The upper portion 32 and the lower portion 34 of the leg 30 are connected to each other by a telescope means 40, described in greater detail below, and enabling the elevation of the lower portion 34 to be adjusted with respect to the upper portion 32 of the leg 30, so that in this way the elevation of the bottom end 36 of the leg 30 can be adjusted.

With this construction the operator can carry the device 10 out into a shallow body of water, introducing the pointed bottom ends of the legs into the bed of the body of water so as to support the device 10 in a stable manner, after which the operator can go up the steps 22 and situate himself on the seat 12 to carry out the fishing operations therefrom.

As may be seen from FIGS. 1 and 2, the seat 12 is in the form of a hollow box having a bottom wall 42 provided with a downwardly directed underside to which the top ends of the legs 14 and 16 are fixed in any suitable manner. The hollow seat 12 is of any suitable polygonal configuration, and it has an endless side wall 44 extending upwardly from the bottom wall 42. The box or seat 12 further includes a top wall 46 which is hingedly connected, as by hinges 48 to the side wall 44 along one side of the latter, so that in this way the top wall 46 can be swung between a lower position closing the hollow seat 12, as shown in solid lines in FIG. 2 and an upper position, shown in dotted lines in FIG. 2, giving access to the interior of the hollow seat 12. In this way it is convenient to locate in the hollow seat 12 fishing gear to which the operator can have ready access.

Referring to FIG. 3, it will be seen that the leg 14 fixedly carries in the region of the seat 12 a bracket 50 which in turn fixedly carries an upwardly directed tube 52 having a top open end through which the handle 54 of a fishing rod 56 can be introduced into the tube 52, so that in this way the fishing rod 56 can be supported by the tube 52. In this way when the fisherman must carry out certain manual operations it is possible for him to temporarily support the fishing rod 56 in the tube 52, and in fact while the fisherman carries the device to and from the body of water the fishing rod 56 can be supported in the tube 52. It will be noted that the axis of the tube 52 is parallel to the axis of the leg 14, so that the leg 14 and the tube 52 have the same slope.

A footrest 58 is fixed at an intermediate portion thereof to the upper portion 32 of the leg 30. This footrest 58 can simply take the form of an angle iron which extends horizontally across and beyond the leg 30 with suitable rivets, screws, or the like, being used to fix the footrest 58 to the upper portion 32 of the leg 30 at an elevation in the region of but below the seat 12 so that when the fisherman sits himself upon the seat 12 he can conveniently place his feet on the footrest 58 to rest his feet thereon.

The leg 30 is hingedly connected at its upper portion 32 to the seat 12 by a hinge 60 which provides for the swingable leg 30 a turning axis located substantially at the elevation of the underside of the bottom wall 42 of the hollow seat 12, so that in this way the leg 30 of the tripod-like structure can be conveniently swung toward and away from the legs 14 and 16 which are rigidly fixed to the seat.

As was indicated above all of the legs are made of elongated metal members of channel-shaped configuration, as is particularly apparent for the leg 14, the lower portion of which is illustrated in FIG. 4. The bottom end of the part of channel-shaped configuration of each leg presses against the top surface of the flat plate, and leg 14 is shown engaging at its bottom end the upper surface of the circular plate 26 in FIG. 4, and the pointed bottom end portion 18 of the leg 14 is in the form of a separate member which extends through an opening of the plate 26 and is fixed to the channel portion of the leg 14. The details of this construction are particularly apparent from FIG. 5 which shows the pointed portion 18 having an upper part 64 of reduced width adapted to extend slidably through a rectangular opening formed in the plate 26, so that upwardly directed shoulders 66 of the pointed portion 18 will engage the lower surface of the plate 26 while the lower end of the channel part 68 of the leg 14 is larger than the opening which receives the part 64 and engages the top surface of the plate 26. The narrower tongue portion 64 of the pointed part 68, after passing with a relatively close fit through the opening of the plate 26 is received in the channel member 68, and openings 70 of the tongue 64 are respectively aligned with openings 72 of the channel member 68, after which suitable rivets or the like pass through these aligned openings for fixing the parts to each other to provide the assembly shown in FIG. 4. This construction is identical for each of the legs of the device of the invention.

Referring now to FIG. 6, the details of the telescope means 40 are illustrated therein. This telescope means 40 includes an elongated tube 74 of rectangular cross section which has opposed open ends for slidably receiving the elongated lower end portion of the upper part 32 and the elongated upper end portion of the lower part 34 of the leg 30. The upper part 32 has in the region of its bottom end an opening 76 which becomes aligned with an opening 78 of the tube 74, and when the opening 76 and 78 are in registry with each other, a bolt 80 is passed through an opening of the tube 74 at its wall 82, this latter opening being aligned with the registering openings 76 and 78, and the bolt 80 is long enough so that when its head end engages the wall 82 the threaded shank of the bolt will extend through and beyond the opening 78 to receive a wing nut 84. In this way the tube 74 can be rigidly fixed in a predetermined position with respect to the upper part 32 of the swingable leg 30. The lower part 34 of this latter leg is longitudinally slidable in the tube 74 so that a selected one of the openings 86 formed in the part 34 can be placed in registry with a lower opening 88 of the tube 74, this opening 88 being aligned with a corresponding opening in the front wall 82. Thus, after the elevation of the lower part 34 of the leg 30 has been selected with respect to the upper part 32 thereof, the operator can place a second bolt 90 through the registering openengs 86 and 88, as well as the aligned opening of the front wall 82, and this bolt 90 can receive a wing nut 92. In this way the height of the plate 38 of the leg 30 can be adjusted, through the telescope means 40, and thus the elevation of the plate 38 with respect to the plates 26 and 28 can be adapted to the particular slope of the bed beneath the body of water in which the device of the invention is to be located.

In order to use the device of the invention the operator will simply carry it out into a body of water placing it, for example, in the position shown in FIG. 7. The pointed portions 18, 20, and 36 of the legs will dig into the bed beneath the body of water, and if this bed should be soft the flat plates 26, 28 and 38 will limit the extent to which the device can sink into the bed. The length of the leg 30 will be adjusted by the telescope means 40 to adapt the device to the slope of the bed beneath the body of water, in such a way that the seat 12 will have a horizontal attitude, and the leg 30 is swung to an angular position with respect to the legs 14 and 16 which will provide for the seat 12 a relatively stable support in the body of water, as indicated in FIG. 7. Then, as shown in FIG. 7, the fisherman will go up the steps 22 and seat himself upon the seat 12, placing his feet on the footrest 58 so that he can very comfortably carry out the fishing operations as indicated in FIG. 7. After the fishing operations are completed the fisherman can place the fishing rod in the tube 52 and can then go down the steps and raise the device from the bed after which the entire construction can be very easily carried away from the body of water and stored in a suitable location with the leg 30 swung toward the legs 14 and 16 so that a compact assembly is provided.

What is claimed is:

1. A device for supporting a fisherman over a shallow body of water, comprising a seat, a pair of elongated substantially rigid legs fixed to and extending downwardly from said seat and both located in a common plane, said legs respectively terminating in bottom ends distant from said seat, a plurality of steps respectively located at different elevations and each extending between and fixed to said legs, and a third elongated substantially rigid leg extending downwardly from said seat and terminating in a bottom end distant therefrom, said third leg being hingedly connected to said seat at a location spaced from said plane for swinging movement toward and away from said plane, so that said third leg forms with said pair of legs a tripod structure adapted to be placed in a shallow body of water with the bottom ends of said legs engaging the bed beneath the body of water and with the seat spaced thereover so that the operator can then go up said steps and support himself on said seat while fishing in the body of water, a footrest carried by said third leg for engaging the feet of the fisherman while he sits on said seat, said seat being hollow and including a hinged top wall for giving access to the interior of said seat so that fishing gear may be stored therein, said third leg including an upper portion hinged to said seat and a lower portion extending downwardly beyond said upper portion and longitudinally aligned therewith, and telescope means connecting said lower portion of said third leg to said upper portion thereof for longitudinal movement relative thereto for adjusting the length of said third leg, each of said legs having a substantially pointed configuration at the region of its bottom end and fixedly carrying just above said pointed bottom end thereof a flat plate which is substantially parallel to said seat for engaging the bed beneath the body of water to limit sinking of the legs into the bed in the event that the latter is soft at least one of said pair of rigid legs fixedly carrying in the region of said seat a tube having an upper open end through which the handle of a fishing rod is adapted to be inserted into said tube so that the fishing rod can be supported by said tube.

2. The combination of claim 1 and wherein said footrest is in the form of an angle iron fixed at an intermediate portion thereof to said third leg in the region of but spaced below said seat, and said angle iron extending transversely across and beyond said third leg.

References Cited

UNITED STATES PATENTS

| 1,078,316 | 11/1913 | Siegel | 182—189 |
| 1,702,249 | 2/1929 | Davidson | 182—129 |
| 1,934,086 | 11/1933 | Page | 182—129 |
| 2,136,354 | 11/1938 | Welsh | 182—129 |
| 2,177,677 | 10/1939 | Staben | 182—108 |
| 2,510,515 | 6/1950 | Nyberg et al. | 182—169 |
| 2,834,526 | 5/1958 | Paris | 182—129 |

FOREIGN PATENTS

| 1,199,190 | 6/1959 | France. |

REINALDO P. MACHADO, Primary Examiner

U.S. Cl. X.R.

182—129, 169